July 25, 1933.  H. HOLZWARTH  1,920,143
EXPLOSION TURBINE PLANT
Filed July 9, 1932   2 Sheets-Sheet 1

INVENTOR
HANS HOLZWARTH
BY
ATTORNEY

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

EXPLOSION TURBINE PLANT

Application filed July 9, 1932, Serial No. 621,548, and in Germany July 15, 1930.

The present invention relates to a power plant intended primarily for vehicles, and particularly for locomotives, and has for its object to provide a power plant which is efficient in operation and simple and compact in construction.

In my copending application Ser. No. 512,340, filed January 30, 1931, is described a portable power plant in which an explosion turbine is arranged to operate the auxiliary machines, such as the charging air compressor, while the exhaust gases of such turbine separately develop in a continuous current turbine the power for driving the vehicle. In a portable power plant of this type, the explosion turbine is advantageously maintained in operation when the expansion machines serving directly to drive the vehicles are only partially under load or completely free from load. The partial load occurs, for example, in travelling downhill, or at moderate speed on level ground (e. g. at curves), while the complete freedom from load occurs when the vehicle is at rest, as when a locomotive has stopped in a station. According to previous proposals respecting the operation of driving mechanism of this type, the exhaust gases were in part or in whole discharged into the atmosphere when the expansion machines were relieved of part or all of their load. This mode of procedure becomes, however, uneconomical when the reduction in load occurs frequently.

According to the present invention, it is proposed to utilize the energy of the gases exhausting from the explosion turbine, which remains in constant operation, for driving the auxiliary machines, and particularly the air compressor, when the expansion machines which directly drive the vehicle are partially or completely relieved of load. To this end, the gases exhausting under pressure from the first or explosion turbine are conducted to a heat exchanger for generating and/or superheating steam, the generated and/or superheated steam being then conveyed to an auxiliary steam turbine coupled to one or more of the auxiliary machines. Thus the gases may be deflected into a steam boiler and caused to generate steam in the latter which is then charged into a steam turbine which is coupled to the air compressor and thereby relieves the explosion turbine of part of its load. The steam space of the steam generator and/or the internal volume of the superheater may be of such increased size that a considerable quantity of steam is stored therein when the secondary engines, i. e., the engines driving the vehicle) are under partial or no load, the pressure of the steam being permitted to rise above the normal operating pressure, so that upon starting the engine a large quantity of accumulated steam is available for providing the high starting torque. This procedure has the advantage that the exhausting gases have comparatively low velocity after their deenergization, so that a special muffling device is not necessary. The conduits for the exhaust gases in the heat exchanger preferably are in the form of Venturi nozzles, so that favorable conditions without undesirable counter-pressure are created for the heat interchange.

Reference is had to the accompanying drawings which illustrate a prefered embodiment of the invention. In said drawings Fig. 1 shows a longitudinal section through a locomotive constructed in accordance with the invention, the same illustrating a separate steam turbine coupled with the air compressor and operated by steam generated with the aid of heat abstracted from gases exhausting from the explosion turbine;

Figure 1:
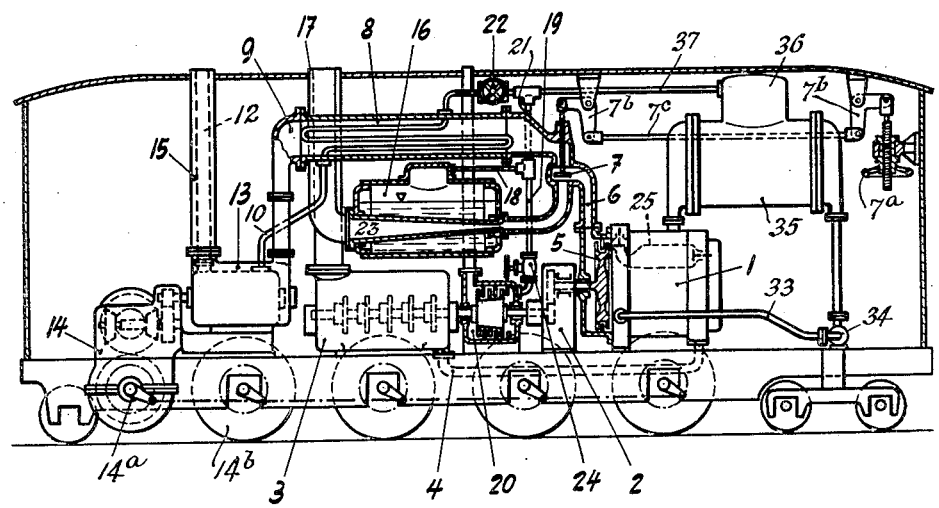
Figure 2:
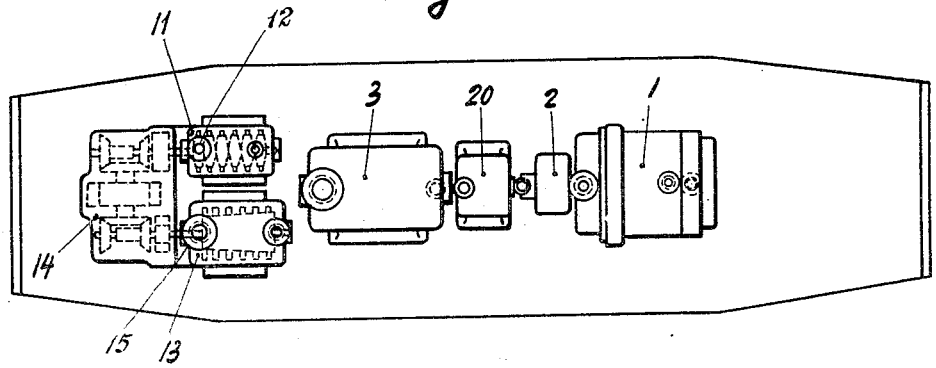
Fig. 2 is a plan view of certain parts of the plant shown in Fig. 1.

The numeral 1 indicates an explosion turbine composed of an impulse wheel 5 driven by puffs of explosion gases intermittently discharged from a plurality of constant volume explosion chambers 25. The explosion turbine is arranged to drive an air-compressor 3 through a transmission 2. The compressed air produced by the compressor 3 is conducted to the explosion chambers of the explosion turbine 1 by conduit 4. When the vehicle is under load, the exhaust gases of the turbine 1, in whose rotor 5 the high pressure, high temperature gases generated in the explosion chambers have given up the amount of energy required to drive the compressor 3, flow through conduit 6 and the suitably adjusted control device 7 into the heat exchanger 8, where they serve to generate or superheat steam. In the arrangement illustrated the heat exchanger 8 is in the form of a steam superheating coil. The gases are withdrawn from the heat exchanger by pipe 9 and are then discharged into a multi-stage gas turbine 13 from which they exhaust into the atmosphere through a pipe 15. The superheated steam from coil 8 is conducted by pipe 10 into the steam turbine 11, the exhaust steam being discharged into the atmosphere through the conduit 12. The turbines 11 and 13 develop the power for driving the vehicle and are connected through the transmission 14 with the dummy shaft 14a which in turn is connected with the driving wheels 14b of the vehicle in any known manner. This structure is shown and described in my copending applications Ser. Nos. 512,340 and 512,343.

Figure 3:
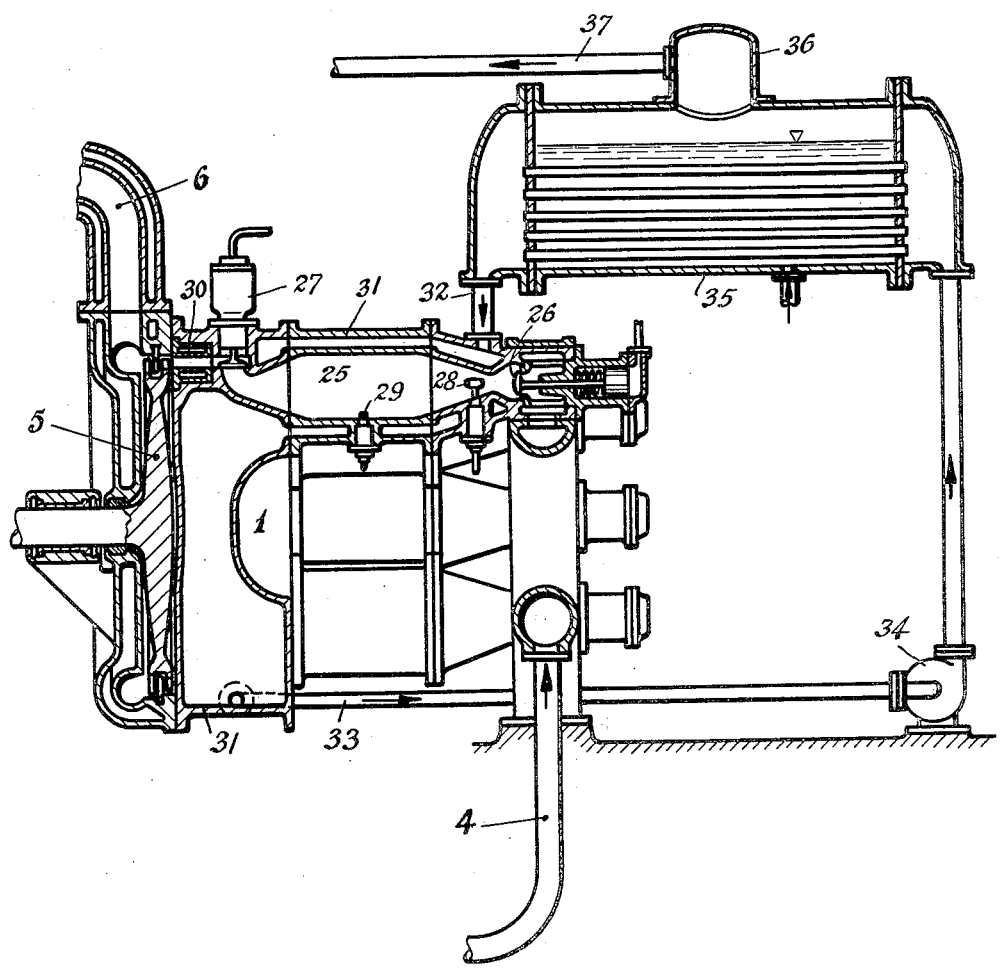
Fig. 3 is an enlarged view illustrating the construction of the explosion turbine and the boiler heated by the waste heat of such turbine.

As shown in Fig. 3 the explosion turbine 1 includes a plurality of constant volume explosion chambers 25, each of which is provided with a hydraulically operated air valve 26 and a similarly operated nozzle or exhaust valve 27. These valves are operated at the proper instants by a hydraulic controller of any suitable construction (see, for example, my United States Patents Nos. 877,194 and 1,763,154).

Fuel is periodically introduced into each of the explosion chambers by a fuel nozzle 28, connected with a suitable fuel pump (not shown) and at the proper instant all of the valves being closed, the explosive mixture in a chamber is ignited by a spark plug 29 or other suitable ignition device. The outlet valve 27 is then opened and the gases discharged through an expansion nozzle 30 against the rotor 5, the gases being expanded in the nozzle 30 to a pressure above atmospheric. The explosion chambers and likewise the turbine housing are provided with cooling jackets 31 into which is introduced a cooling agent, such as oil of high boiling point, through a conduit 32. The oil is withdrawn by a conduit 33 and fed by a pump 34 into a boiler 35, wherein such oil generates steam of high pressure. The rate of circulation of the oil may be so controlled that the oil enters the boiler at about 260° to 265° C. and leaves the boiler at about 230° C., steam being generated at a pressure of about 20 atm. The steam space of the boiler 35 and the dome 36 may be of such size that a considerable mass of steam may be stored therein when the engine is idling or operating under only partial load. The steam from boiler 35 flows through a conduit 37 to the superheating coil 8, the conduit 37 being controlled by a valve 22. It will be understood that when the engine is idling the valve 22 will be closed, and is opened again when the engine is subjected to load.

When the driving turbines 11 and 13 are under only partial load, as for example, when the locomotive is travelling downhill or at a moderate speed on level ground, or when the turbines 11 and 13 are under no load at all, as when the locomotive is at rest in a station, there arises the necessity of disposing of the exhaust gases of the explosion turbine 1, the latter being preferably maintained in constant operation. The discharge of the exhaust gases of such turbine directly into the atmosphere has the disadvantage of poor economy; according to the invention these exhaust gases are employed indirectly to assist in driving the auxiliary mechanism; that is, they are employed to generate steam which is then utilized to generate power, for example, for the air compressor. When the vehicle is under load, the exhaust gases, which have generated enough power in the rotor 5 of the explosion turbine to drive the compressor 3, flow through conduit 6 and past the suitably adjusted control device 7 into the heat exchanger 8. From the latter they are conveyed by conduit 9 into the turbine 13, as described above. In order to utilize the exhaust gases economically when the continuous current turbine 13 is under partial or no load, the control device 7 is adjusted by means of the hand wheel 7a, bell-crank levers 7b and connecting rod 7c to the position in which the exhaust gases are permitted to enter the heat exchanger 16. Thus, when the engine is idling the control device or valve 7 is raised to a position in which the heat exchanger 8 is completely cut off from the partially exhausted gases; while during intervals of partial load, the valve 7 is adjusted to an intermediate position as shown in Fig. 1. The conduits 23 for the gases in the heat exchanger are preferably in the form of Venturi nozzles, as shown, so that favorable conditions for heat interchange are provided without producing any undesirable counterpressure against the explosion chamber 1. The gases discharge from the heat exchanger 16 through the pipe 17 into the atmosphere.

The generated steam is withdrawn from the heat exchanger 16 by a conduit 18 and is conducted by a conduit 19 to an auxiliary steam turbine 20 which is coupled with the compressor 3 and thus relieves the explosion turbine 1 of a corresponding amount of load. The conduit 19 is provided with a valve 24 which controls the admission of steam to the turbine 20. The conduit 18 is connected also to the steam line 37 by a pipe 21, so that when the engine is operating under heavy load, the steam from the heat exchanger 16 may be conducted through valve 22 and the superheater 8 into the steam turbine, the valve 24 being closed.

It is within the scope of the invention to provide the heat exchanger 16 with a large steam collecting space so that the same may serve simultaneously as a steam accumulator when the engine is idling. Upon subsequent subjection of the expansion machines 11 and 13 to load, the generated and accumulated steam may be utilized in the steam turbine 11 for taking up such load, together with the steam generated in the boiler 35.

Where in the claims I speak of a "pressure considerably above atmospheric", such expression is to be understood to mean a pressure much in excess of that required to insure discharge of the gases into the atmosphere; namely, a pressure at which the gases can do work economically or at which they can be expanded to a high velocity—for example, 2 to 5 atmospheres and even higher.

By connecting the steam spaces of boilers 16 and 35, a steam accumulating space of considerable size is obtained which collects steam when valve 22 is closed.

The present application is a continuation in part of my copending application Ser. No. 551,809, filed July 18, 1931.

I claim:

1. A portable power plant comprising an explosion turbine including a constant volume explosion chamber, air and fuel charging mechanisms at the inlet end of the chamber, a discharge valve at the discharge end of the chamber, an expansion nozzle for expanding the intermittent puffs of gases discharged by said chamber to a pressure considerably above atmospheric, and an impulse rotor arranged to be driven by the gases discharging from said nozzle, and air compressor coupled with said turbine to be driven thereby, a conduit for conveying the compressed air from said compressor to the inlet end of the explosion chamber, an elastic fluid engine for driving the vehicle, a conduit for conducting the exhaust combustion gases from said turbine to said engine, a heat exchanger, a conduit for conducting a fluid to said exchanger to be heated therein, an elastic fluid turbine coupled with said compressor, a conduit for conveying the heated fluid to said last-mentioned turbine, and control mechanism associated with said first-mentioned conduit and operable to admit all of said exhaust gases from said explosion turbine to said first-mentioned engine when the latter is under heavy load, but adjustable to cut off from such engine part or all of said exhaust gases and to deflect such gases to said heat exchanger when such engine is under partial or no load.

2. A portable power plant comprising an explosion turbine including a constant volume explosion chamber, air and fuel charging mechanisms at the inlet end of the chamber, a discharge valve at the discharge end of the chamber, an expansion nozzle for expanding the intermittent puffs of gases discharged by said chamber to a pressure considerably above atmospheric, and an impulse rotor arranged to be driven by the gases discharging from said nozzle, an air compressor coupled with said turbine to be driven thereby, a conduit for conveying the compressed air from said compressor to the inlet end of the explosion chamber, steam and gas engines for driving the vehicle, a conduit for conveying the exhaust combustion gases from said turbine to the gas engine, a heat exchanger, control mechanism operable, when said gas engine is under partial or no load, to cut off from said gas engine part or all of said exhaust gases and to deflect such gases to said heat exchanger, a conduit for conveying water to said exchanger whereby steam is generated in the latter, and a conduit for conducting such steam to said steam engine when the load on the vehicle is increased.

3. A power plant as set forth in claim 2, including a plurality of gas conduits in the heat exchanger arranged to receive the gases deflected by the control mechanism, said conduits being in the form of Venturi nozzles.

4. A power plant as set forth in claim 2, including mechanism for circulating a cooling agent through the explosion turbine, a boiler arranged to receive the heated cooling agent for generating steam with the heat absorbed by such agent, a connection between the steam space of such boiler and said heat exchanger, whereby the generated steam is superheated in the latter, and a valve in the conduit which conducts steam to the steam engine, whereby said boilers may be cut off from the steam engine when the plant is idling.

HANS HOLZWARTH.